Patented Aug. 28, 1951

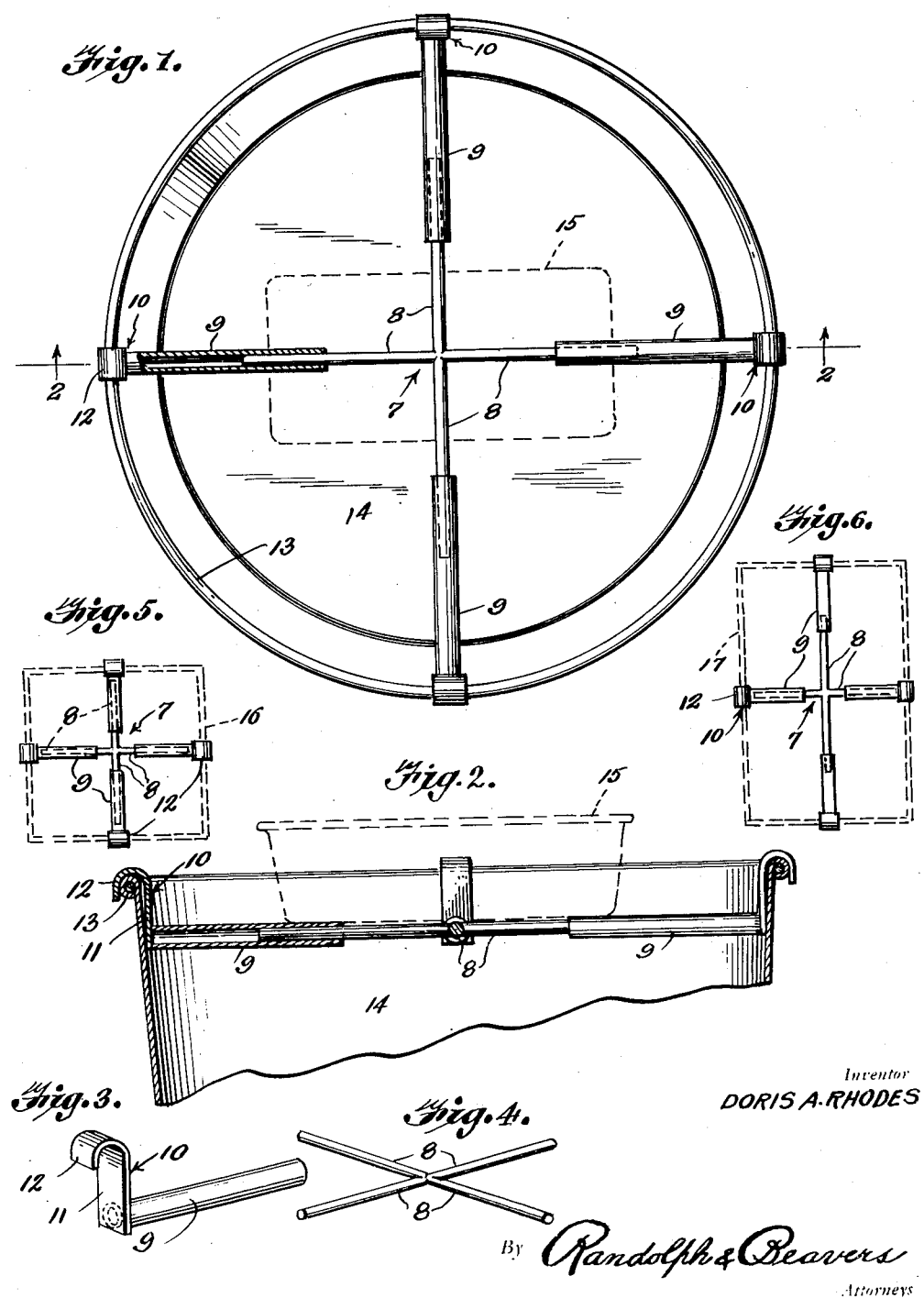

2,565,782

UNITED STATES PATENT OFFICE 2,565,782

SUPPORT

Doris A. Rhodes, Wichita, Kans.

Application February 5, 1947, Serial No. 726,613

1 Claim. (Cl. 248—200)

This invention relates to an adjustable support for receptacles and more especially to a support or holder adapted to be mounted detachably upon or holder adapted to be mounted detachably upon receptacles or vessels used in the laundry or kitchen of a dwelling for holding bluing or starching containers or for holding receptacles containing berries, fruits, vegetables or other articles for cooking, canning or preparing in other ways.

More especially, it is an object of the present invention to provide an adjustable support or holder capable of being mounted upon the rims of containers, receptacles or vessels of various sizes and shapes including circular, square, oblong.

Another object of the invention is to provide a holder or support especially adapted for supporting a pan of bluing or a starching pan in a position accessible to a wringer of a washing machine, thus leaving both hands of the operator free to be utilized in the operation of the washing machine and in handling the laundry being starched and being passed through the wringer.

Various other objects and advantages of the invention will hereinafter become more fully apparent from the following description of the drawing, illustrating a preferred embodiment thereof, and wherein:

Figure 1 is a top plan view, partly in horizontal section, showing the adjustable support mounted on the rim of an open top container or receptacle;

Figure 2 is a diametrical sectional view thereof, partly in side elevation, taken substantially along a plane as indicated by the line 2—2 of Figure 1;

Figures 3 and 4 are perspective views of parts of the adjustable support or holder; and Figures 5 and 6 are top plan views on reduced scales showing the support or holder mounted on receptacles or containers of different shapes.

Referring more specifically to the drawing, the support or holder in its entirety is designated generally 7 and includes an intermediate portion formed of equally spaced arms 8 which are arranged to form a cross and which are formed integral or suitably connected at their junctures so as to be disposed in substantially the same planes. The arms 8 are preferably spaced 90° apart, as illustrated in the drawing, and each of said arms telescopically and detachably engages a tubular extension 9 of the support 7. The tubular extensions 9 are each provided with a hook, designated generally 10, at the outer end thereof having a depending shank portion 11, the free end of which is secured in any suitable manner over the outer end of the tube 9 for closing said end. Each hook 10 is provided with an out-turned hook portion 12 at its upper end of sufficient size to readily engage over the rim of a receptacle.

As illustrated in Figures 1 and 2, the support 7 is assembled with a tubular extension 9 telescopically disposed on each supporting arm 8 and forming an extension thereof. The hook portions 12 of the four extensions are shown engaged over the rolled rim 13 defining the open top of a vessel or container 14 for mounting the arms 8 and tubular extension 9 within the vessel 14, adjacent and substantially parallel to the open top thereof. The arms 8 and tubular extension 9 combine to form a support for a pan or receptacle, indicated in dotted lines in Figures 1 and 2 at 15 and which is thereby supported partially within the upper part of the vessel 14 for use in conjunction therewith, as in preparing vegetables or fruits for cooking or canning or for containing a bluing or starching solution for use in domestic laundering.

It will be readily apparent that the size and shape of the support or holder 7 may be varied by individually varying the extent to which the tubes 9 are telescoped onto the arms 8 so that the support 7 may be mounted on smaller or larger vessels and on vessels of various shapes such as the substantially square vessel, indicated in dotted lines at 16 in Figure 5, or the elongated rectangular vessel, indicated in dotted lines at 17 in Figure 6.

When not in use, the tubular extensions may be detached from the crossed supporting arms 8 and the entire unit then grouped into a small, compact bundle which will require a minimum of storage space.

Various modifications and changes are contemplated and may obviously be resorted to, without departing from the spirit and scope of the invention as hereinafter defined by the appended claim.

I claim as my invention:

A support or holder for receptacles comprising a plurality of rigidly connected radially projecting arms of substantially circular cross section arranged to form a cross, a tube of circular cross section telescopically and detachably mounted on the outer end of each arm and adjustable relatively thereto, and an upwardly projecting hanger secured to and rising from the outer end of each tube and terminating in an outwardly turned hook portion, each of said hook portions being adapted to detachably engage over the rim of an open top container or receptacle for supporting the holder within the receptacle or container with said arms and tubes all disposed in substantially the same plane and substantially parallel to the plane of the container rim and therebeneath.

DORIS A. RHODES.

REFERENCES CITED

The following references are of record in the file of this patent:

UNITED STATES PATENTS

| Number | Name | Date |
|--------|------|------|
| 982,626 | Netschert | Jan. 24, 1911 |
| 1,015,946 | Ebner | Jan. 30, 1912 |
| 1,575,416 | Deman | Mar. 2, 1926 |